Figure 1:
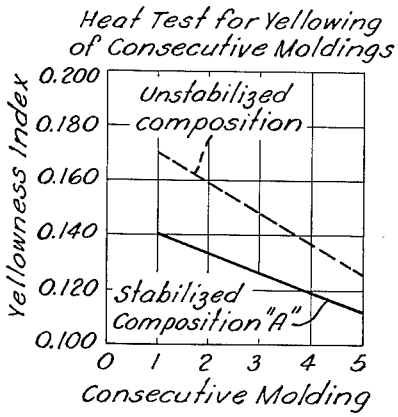

Nov. 20, 1962     C. R. JOHANSSON     3,065,200
STABILIZED COMPOSITIONS COMPRISED OF COPOLYMERS
OF ALKENYL AROMATICS AND ACRYLONITRILE
Filed July 9, 1958     2 Sheets-Sheet 1

INVENTOR.
Carlton R. Johansson
ATTORNEY

Nov. 20, 1962 C. R. JOHANSSON 3,065,200
STABILIZED COMPOSITIONS COMPRISED OF COPOLYMERS
OF ALKENYL AROMATICS AND ACRYLONITRILE
Filed July 9, 1958 2 Sheets-Sheet 2

INVENTOR.
Carlton R. Johansson
BY Jerome Rudy
ATTORNEY

United States Patent Office 3,065,200
Patented Nov. 20, 1962

3,065,200
STABILIZED COMPOSITIONS COMPRISED OF CO-
POLYMERS OF ALKENYL AROMATICS AND
ACRYLONITRILE
Carlton R. Johansson, Auburn, Mich., assignor to The
Dow Chemical Company, Midland, Mich., a corpora-
tion of Delaware
Filed July 9, 1958, Ser. No. 747,490
4 Claims. (Cl. 260—45.9)

The present invention contributes to the organic poly-
mer art and relates more particularly to compositions
comprised of copolymers of various monomeric alkenyl
aromatics (especially styrene) and acrylonitrile which are
stable against discoloration. This application is a con-
tinuation-in-part of copending application for United
States Letters Patent having Serial Number 566,082
which was filed on February 17, 1956, now abandoned.

Certain copolymers of acrylonitrile and styrene (or the
like alkenyl aromatic monomers), particularly those which
contain amounts up to about 40 percent by weight of
acrylonitrile polymerized in the copolymer molecule, are
inclined to discolor to objectionable shades of yellow and
brown upon exposure to light or to the atmosphere or to
heat at elevated temperatures such as is occasioned during
their fabrication into various shaped and extruded articles,
or to any combination of such conditions. These unde-
sirable tendencies prohibit the preparation from such co-
polymeric materials of transparent and opaque articles
having light and delicate shades of coloration.

It would be advantageous, and it is the principal ob-
ject of this invention, to provide compositions comprised
of copolymers of styrene (or the like alkenyl aromatic
monomers) and acrylonitrile which have a substantially
diminished propensity to discolor upon exposure to light
or to the atmosphere or to heat at elevated temperatures.

This desirable result may be accomplished according to
the present invention by incorporating one or more par-
ticular varieties of alkanol derivatives of an alkylene di-
amine (as hereinafter delineated), in an amount between
about 0.005 and 5.0 percent by weight, based on the weight
of the resulting composition, in a copolymer of styrene
(or the like ethylenically unsaturated alkenyl aromatic
monomer) and acrylonitrile which contains from about
1 up to about 40 percent by weight of the acrylonitrile
(also known as vinyl cyanide) polymerized in the co-
polymer molecule, with the balance, of course, being the
polymerized alkenyl aromatic constituent. Advantageous-
ly, the thus stabilized compositions are comprised of a
copolymer which contains in the neighborhood of 25–35
percent by weight of acrylonitrile polymerized in the co-
polymer molecule, particularly when styrene/acrylonitrile
copolymers are utilized, and the amount of stabilizer em-
ployed is between about 0.05 to 2.0 percent by weight.

Compositions according to the invention advantageous-
ly have a significantly arrested or greatly and materially
minimized tendency to discolor upon exposure to light or
to the atmosphere or to heat at elevated temperatures or
upon aging while retaining the desirable physical proper-
ties of the unstabilized copolymers.

The alkanol derivatives of alkylene diamines which may
be employed as stabilizers in the practice of the present
invention include the N,N,N',N'-tetra alkanol substituted
compounds which may be prepared, inter alia, by condens-
ing propylene oxide or ethylene oxide, or both, with such
alkylene diamines as ethylene diamine, propylene di-
amine, butylene diamine, trimethylene diamine, hexa-
methylene diamine and the like. Advantageously, the
compound N,N,N',N'-tetrakis (2-hydroxypropyl)-ethylene
diamine is utilized. This last-identified material is com-
mercially available from Wyandotte Chemicals Corpora-
tion as "Quadrol."

Thus, the stabilizing additaments suitable for use are
of the general structure (or mixtures of compounds con-
forming thereto):

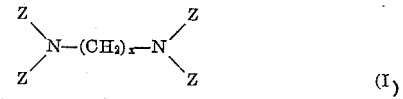
(I)

wherein $x$ is an integer from 2 to about 6 and each Z
is independently selected from the group consisting of
monohydroxyethyl and monohydroxypropyl substituents.
As is apparent, alkanol derivatives having any combina-
tion of mixed hydroxyethyl and hydroxypropyl substitu-
ents within the scope of Formula I are useful in the prac-
tice of the invention. Typical of such materials is N-
monohydroxyethyl-N,N'N'-tri(2-hydroxypropyl) ethylene
diamine. Likewise, N,N,N',N'-tetrakis hydroxyethyl eth-
ylene diamine and the like may be satisfactorily utilized.
Either 2-hydroxypropyl or 3-hydroxypropyl substituents
may be attached to the alkylene diamine constituent of
the stabilizer. The 3-hydroxypropyl substituents are ob-
tainable, as is known, in the reaction between an alkylene
diamine and 3-chloro- or 3-bromopropanol. In any event,
it is generally desirable for at least one methylene unit
in any of the alkanol substituents present to separate the
hydroxy group thereon from the nitrogen in the substi-
tuted diamine.

While styrene is solely employed with great advantage
as the alkenyl aromatic constituent in the acrylonitrile
copolymers, other alkenyl aromatic monomers of the gen-
eral structure $$CH_2=CGAr \qquad (II)$$

in which G is selected from the group consisting of hydro-
gen and methyl and Ar is an aromatic radical (including
various alkyl and halo-ring-substituted aromatics) of from
6 to about 10 carbon atoms. Thus, the acrylonitrile co-
polymer may be comprised of such polymerized alkenyl
aromatic units as are derived from any of the several
chlorostyrene (i.e., monochloro-and dichlorostyrene), any
of the several methyl styrenes (i.e., vinyl toluene, the di-
methylstyrenes, etc.), alpha-methyl styrene, vinyl naph-
thalene, and so forth. The alkenyl aromatics may be uti-
lized in any mixture of monomers that may be desired
within the scope of Formula II (as interpolymers of
acrylonitrile with styrene and alpha-methyl styrene, etc.)
or, as is the case with styrene, may be independently polym-
erized with the acrylonitrile. Preferably, of course, nor-
mally solid acrylonitrile copolymers are employed.

The stabilizing alkanol derivative of an alkylene di-
amine may be incorporated in the copolymeric material
in any desired manner including directly blending it in the
copolymeric material using suitable mixing, milling or
compounding apparatus or by incorporating it by like
techniques from liquid dispersions. Employment of the
latter mode of incorporation frequently may serve to
extend the stabilizer and facilitate its more homogeneous
distribution in the composition. In certain instances a
better dispersion may alternatively be achieved by heat-
ing the stabilizer to lower its viscosity during its incor-
poration.

As an illustrative example, a molten copolymer of
styrene and acrylonitrile which contained about 28 per-
cent by weight of acrylonitrile polymerized in the co-
polymer molecule, was extruded at the rate of about 165
pounds per hour through a conventional 2½″ extruder
equipped with a mixing torpedo. A solution of about 1
part by weight of N,N,N',N'-tetrakis (2-hydroxypropyl)
ethylene diamine in 2 parts by weight of dioctylphthalate
was metered into the hot copolymer entering the extruder
at a rate which had been calculated to provide about 0.05
percent by weight of the alkanol derivative of ethylene
diamine in the composition. The dioctylphthalate served to plastify the composition, which was extruded and pelletized to be used for subsequent molding. The initial color of the extruded stabilized composition was appreciably less yellow, upon visual comparison, than the same copolymer when it is similarly extruded in an unstabilized condition. In addition, the stabilized composition did not discolor upon exposure to the atmosphere or to ultraviolet light for prolonged periods or upon subsequently being molded at an elevated temperature.

Similar results were obtained when a like amount of the N,N,N',N'-tetrakis (2-hydroxypropyl) ethylene diamine was added directly to the extruding copolymer after being warmed to reduce its viscosity and without dissolving it in a plasticizer. In contrast, the unstabilized copolymer discolors objectionably upon being molded or when it is subjected to air for a time. Other amounts of the stabilizing compound may also be beneficially incorporated in compositions according to the invention. The improvement in the stabilized compositions is visually appreciable and is also statistically apparent upon spectrophotometric analysis.

This is convincingly demonstrated and substantiated by the results of various tests which were performed with samples of an unstabilized styrene-acrylonitrile copolymer composition in which the copolymer contained about 28 percent by weight of acrylonitrile polymerized in the copolymer molecule and with samples of the same copolymer in a composition (designated as Composition "A") stabilized in the foregoing manner with about 0.05 percent by weight of N,N,N',N'-tetrakis (2-hydroxypropyl)-ethylene diamine. A yellowness-index (Y.I.) was determined for samples of each of the compositions which had been subject to identical tests. The yellowness-index represents the relative degree or shade of yellowness, based upon spectrophotometric analysis, which is measurably apparent in a given sample. It conforms closely to the impressions gained through visual observation. Yellowness-indices having greater numerical values represent the spectrophotometric measurement of greater proportional degrees of yellowness or deeper shades of yellow coloration in the composition.

Samples of both the stabilized and unstabilized compositions were heat tested for yellowing after a given number of consecutive molding cycles with each sample by placing granules of each in a 1-ounce Watson-Stillman molding machine and allowing them to remain at a temperature of about 500° F. for a period of about 5 minutes before molding five consecutive wafers of each of the samples. The yellowness-indices of the first and fifth wafers which were molded from each composition are given in Table I and graphically illustrated in FIGURE 1 of the accompanying drawing.

TABLE I

*Heat-Test for Yellowing of Consecutive Moldings*

| Numerical Order of Consecutive Molded Wafer | Y.I. of Unstabilized Compositions | Y.I. of Stabilized Composition "A" |
| --- | --- | --- |
| 1st | 0.170 | 0.140 |
| 5th | 0.127 | 0.113 |

Figure 2:
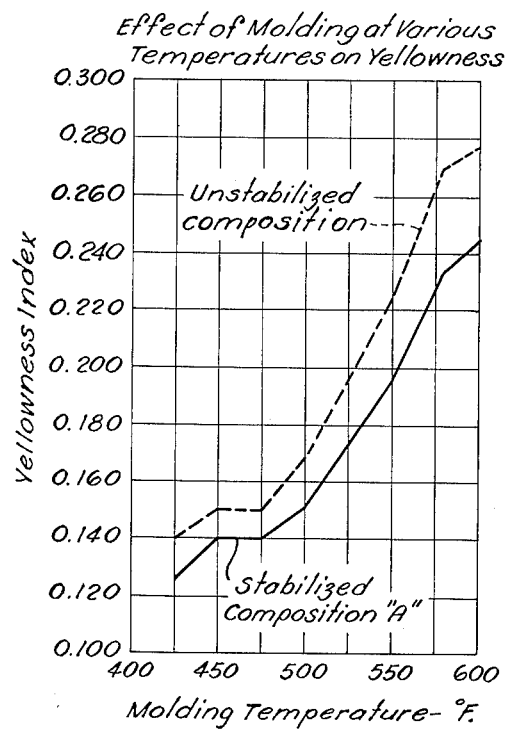

In addition, samples of each of the compositions were injection molded at various temperatures in a standard Fellows Molding Machine and spectrophotometrically tested for their yellowness-indices. The results are contained in Table II, which follows, and are also graphically contrasted in FIGURE 2 of the drawing.

TABLE II

*Effect of Molding at Various Temperatures on Yellowness*

| Molding Temperature, ° F. | Y.I. of Unstabilized Composition | Y.I. of Stabilized Composition "A" |
| --- | --- | --- |
| 425 | 0.141 | 0.123 |
| 450 | 0.150 | 0.141 |
| 475 | 0.151 | 0.141 |
| 500 | 0.168 | 0.151 |
| 550 | 0.223 | 0.195 |
| 580 | 0.268 | 0.224 |
| 600 | 0.278 | 0.235 |

Figure 3:
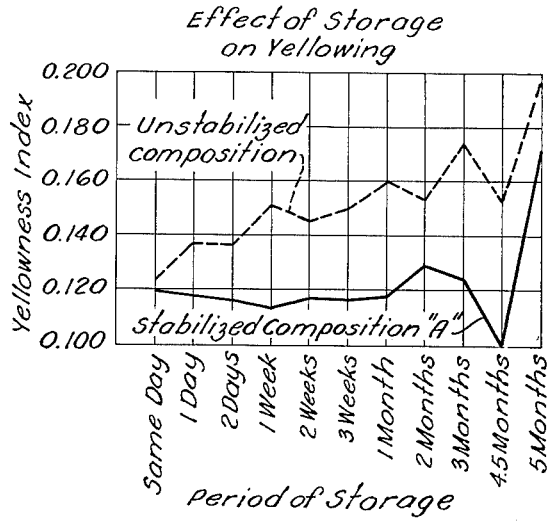

Moldings of the samples of each of the compositions were made in a conventional manner after being held in storage for various periods. Table III includes these results which also are depicted graphically in the drawing in FIGURE 3.

TABLE III

*Effect of Storage on Yellowing*

| Storage Period After Production Before Molding | Y.I. of Unstabilized Composition | Y.I. of Stabilized Composition "A" |
| --- | --- | --- |
| Same day | 0.122 | 0.119 |
| 1 day | 0.136 | 0.118 |
| 2 days | 0.136 | 0.116 |
| 1 week | 0.150 | 0.114 |
| 2 weeks | 0.145 | 0.118 |
| 3 weeks | 0.149 | 0.117 |
| 1 month | 0.161 | 0.119 |
| 2 months | 0.152 | 0.130 |
| 3 months | 0.176 | 0.125 |
| 4½ months | 0.151 | 0.099 |
| 5 months | 0.199 | 0.170 |

Figure 4:
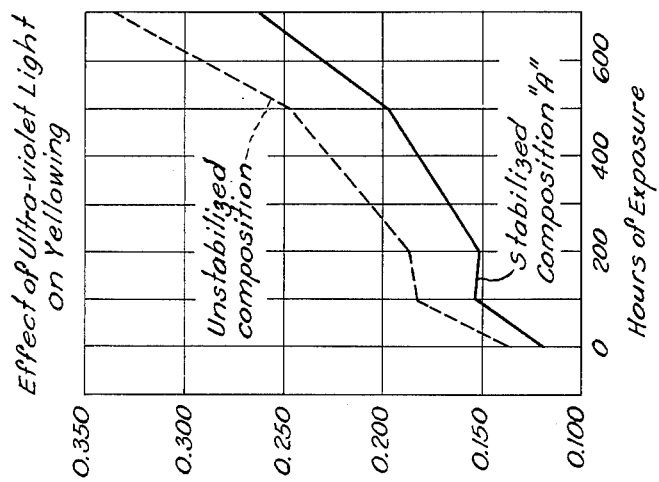

The results of tests of each of the compositions after their exposure for varying periods to ultra-violet light in a standard Atlas Fadeometer are given in the concluding Table IV and are also graphically represented in FIGURE 4 of the drawing.

TABLE IV

*Effect of Ultra-Violet Light on Yellowing*

| Hours of Exposure In Atlas Fadeometer | Y.I. of Unstabilized Composition | Y.I. of Stabilized Composition "A" |
| --- | --- | --- |
| Blank | 0.136 | 0.118 |
| 100 | 0.181 | 0.154 |
| 200 | 0.186 | 0.152 |
| 500 | 0.248 | 0.198 |
| 700 | 0.334 | 0.264 |

Figure 5:
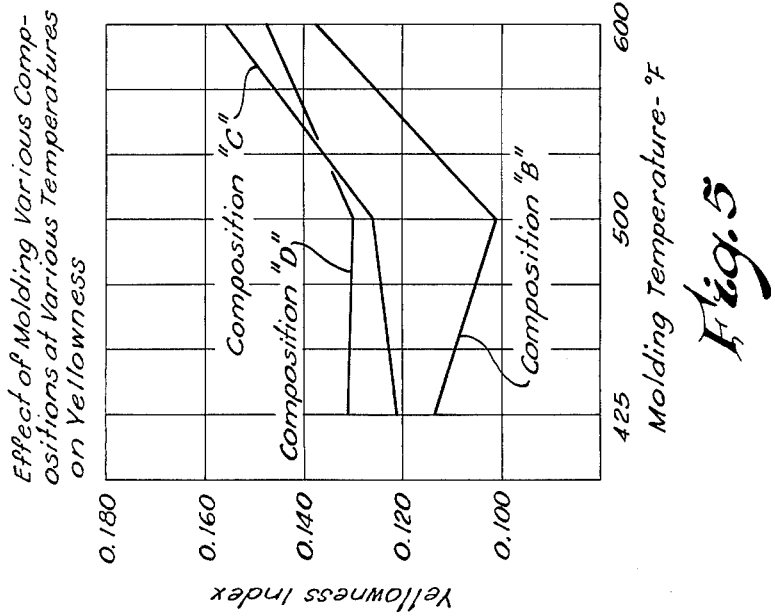

By way of still further illustration, three additional compositions stabilized in accordance with the present invention were prepared and tested to determine the effect of molding them at various temperatures with the Fellows Molding Machine (as in the foregoing), using about the same type and composition of styrene/acrylonitrile copolymer as in Composition "A." Each of the compositions were prepared as above described so as to contain about 0.066 percent by weight, on the composition weight, of the particular alkanol derivative of the alkylene diamine employed. Composition "B" was prepared with N,N,N',N'-tetrakis (2-hydroxypropyl) ethylene diamine ("Quadrol"); Composition "C" with N-2-hydroxy-N,N',N' tri (2-hydroxypropyl) ethylene diamine; and Composition "D" with N,N,N',N'-tetrakis (2-hydroxyethyl) ethylene diamine. The results are contained in Table V below and are also graphically set forth in FIGURE 5 of the drawing, wherein the similar and analogous desirable behavior of Compositions "B," "C" and "D" is even more clearly evident.

TABLE V

*Effect of Molding Various Compositions at Various Temperatures on Yellowness*

| Molding Temperature, °F | 425 | 500 | 600 |
|---|---|---|---|
| Y. I. of Composition "B" | 0.108 | 0.101 | 0.137 |
| Y. I. of Composition "C" | 0.121 | 0.126 | 0.156 |
| Y. I. of Composition "D" | 0.131 | 0.130 | 0.147 |

Excellent results commensurate with those particularized in the foregoing are obtained when any of the alkanol derivatives of alkylene diamines within the scope of Formula I (in addition to those specified) are employed for stabilizing the same or analogous styrene/acrylonitrile copolymers or when any of the stabilizers of Formula I including those specified are employed in compositions within the scope of the invention comprised of copolymers of acrylonitrile with vinyl toluene, mono- or dichlorostyrene, or any other of the alkenyl aromatic monomers of the Formula II.

The stabilized compositions of the present invention can be made into transparent and lightly colored molding powders which are impossible to obtain with the unstabilized copolymer. Of course, pigmented and/or filled compositions can also be prepared in the practice of the invention. In addition, the stabilizing alkanol derivatives of alkylene diamines have no deleterious influence or effect upon the copolymer. The stabilized compositions of the invention can be fabricated into articles having essentially the same physical properties as would the characteristic of similar compositions in an unstabilized condition.

What is claimed is:

1. Composition consisting essentially of (1) a copolymer of (*a*) between about 1 and about 40 weight percent, based on the copolymer weight, of acrylonitrile polymerized with (*b*) between about 99 and 60 weight percent, based on the copolymer weight, of an alkenyl aromatic of the formula:

$$CH_2=CGAr$$

in which G is selected from the group consisting of hydrogen and methyl and Ar is a monovalent aromatic radical of from 6 to about 10 carbon atoms having a nucleus in the benzene series, and (2), as a stabilizer therefor, between about 0.005 and 5.0 weight percent, based on the weight of the composition, of an N,N,N',N'-tetra substituted alkanol derivative of an alkylene diamine of the formula:

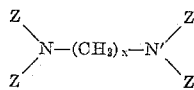

wherein $x$ is an integer from 2 to 6 and each Z is independently selected from the group consisting of 2-hydroxyethyl, 2-hydroxypropyl and 3-hydroxypropyl substituents, wherein said copolymer (1) is the only polymeric constituent in the composition.

2. The composition of claim 1 containing said stabilizer (2) in an amount between about 0.05 and 2 weight percent, based on composition weight.

3. The composition of claim 1, wherein the stabilizer (2) is N,N,N',N'-tetrakis (2-hydroxypropyl) ethylene diamine.

4. Composition consisting essentially of a copolymer of styrene and acrylonitrile which contains about 25–35 weight percent of acrylonitrile polymerized in the copolymer molecule and, as a stabilizer therefor, between about 0.05 and 2.0 weight percent of N,N,N',N'-tetrakis (2-hydroxypropyl) ethylene diamine, based on the composition weight.

References Cited in the file of this patent

UNITED STATES PATENTS

| 2,540,996 | Ryden | Feb. 6, 1951 |
| 2,809,955 | Matheson et al. | Oct. 15, 1957 |
| 2,835,647 | Schulken et al. | May 20, 1958 |
| 2,878,232 | Schweitzer | Mar. 17, 1959 |

OTHER REFERENCES

Wyandotte Technical Data Sheet, "Quadrol," May 9, 1956.